United States Patent [19]
Boggs et al.

[11] Patent Number: 5,959,994
[45] Date of Patent: Sep. 28, 1999

[54] ATM/SONET NETWORK ENHANCED AS A UNIVERSAL COMPUTER SYSTEM INTERCONNECT

[75] Inventors: Gary Lee Boggs, Poway, Calif.; Robert Samuel Cooper, Columbia, S.C.; Gene Robert Erickson; Douglas Edward Hundley, both of Poway, Calif.; Gregory H. Milby, San Marcos, Calif.; P. Keith Muller, San Diego, Calif.; Curtis Hall Stehley, San Diego, Calif.; Donald G. Tipon, San Diego, Calif.

[73] Assignee: NCR Corporation, Dayton, Ohio

[21] Appl. No.: 08/699,260

[22] Filed: Aug. 19, 1996

[51] Int. Cl.⁶ .................................................. H04L 12/56
[52] U.S. Cl. .................... 370/399; 370/471; 370/474; 370/905; 370/907
[58] Field of Search ................................... 370/395, 474, 370/352, 399, 389, 396, 397, 400, 401, 409, 412, 428, 429, 465, 470, 471, 398, 905, 907; 395/200.6, 200.79, 200.8; 359/115, 118

[56] References Cited

U.S. PATENT DOCUMENTS

| | | | |
|---|---|---|---|
| 5,408,469 | 4/1995 | Opher et al. | 370/399 |
| 5,519,695 | 5/1996 | Purohit et al. | 370/352 |
| 5,717,691 | 2/1998 | Dighe et al. | 370/401 |
| 5,726,985 | 3/1998 | Daniel et al. | 370/382 |
| 5,737,334 | 4/1998 | Prince et al. | 370/395 |
| 5,742,765 | 4/1998 | Wong et al. | 395/200.6 |
| 5,777,994 | 7/1998 | Takihiro et al. | 370/395 |
| 5,809,024 | 9/1998 | Ferguson et al. | 370/395 |

OTHER PUBLICATIONS

Anzaloni, A., et al., Fiber Channel (FCS)/ATM Interworking: A design solution, 1993 IEEE, pp. 1127–1133.
Anzaloni, A., et al., Fiber Channel FCS/ATM Interworking: design and performance study, 1994 IEEE, pp. 1801–1807.

*Primary Examiner*—Alpus H. Hsu
*Attorney, Agent, or Firm*—Gates & Cooper

[57] ABSTRACT

An enhanced ATM switch with CPU node interconnect functionality and peripheral interconnect functionality and network functionality. The ATM switch provides low latency transfer between computer nodes and performs input/output operations with peripherals through the ATM network. SCSI Fibre Channel protocol (FCP) commands are implemented according to ATM standards to provide communication with peripherals. A segmentation and reassembly (SAR) unit is provided for performing ATM segmentation and reassembly. The SAR includes functional units which allow direct connection of an application agent to the core of the switch once the cell characteristics are determined by the application agent and provides ATM cell translation to and from available kernel buffers. The transmission media in the ATM network comprises digital optical links. The enhanced ATM switch may also include a synchronous optical network (SONET) interface for providing SONET transmission over the digital optical links in the ATM network.

43 Claims, 13 Drawing Sheets

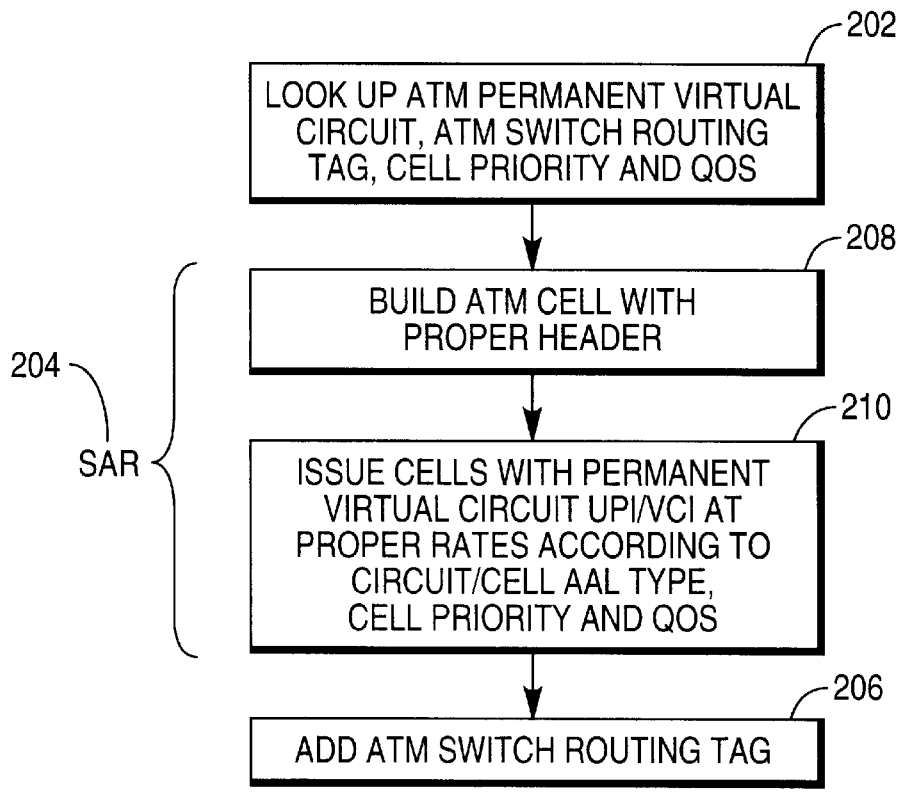
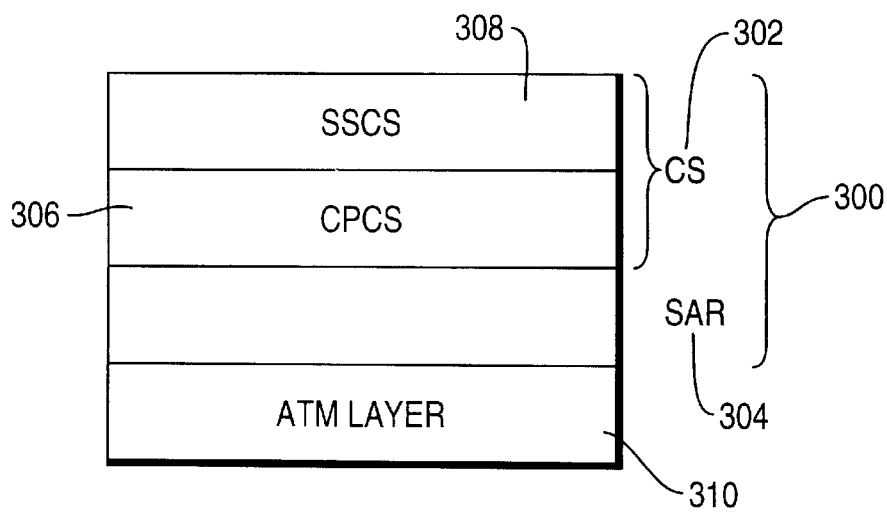

MULTIPLE DATA CELLS FOR TRANSFER

LAST DATA CELL OF TRANSFER

FIG. 10A

MULTIPLE CELLS FOR TRANSFER

1000 ↙

| GFC | VPI |
|---|---|
| VPI | VCI |
| VCI | |
| VCI | PT | RES | CLP |
| HEC | | | |
| RESERVED (8 BYTES) | | | | ← 1070
| FCP_STATUS (4 BYTES) | | | | ← 1072
| FCP_RESID (4 BYTES) | | | | ← 1074
| FCP_SNS_LEN (4 BYTES) | | | | ← 1076
| FCP_RSP_LEN (4 BYTES) | | | | ← 1078
| FCP_RSP_INFO (M BYTES <= 86) | | | |

FIG. 10B

LAST CELL OF TRANSFER

1050 ↙

| GFC | VPI |
|---|---|
| VPI | VCI |
| VCI | |
| VCI | PT | RES | CLP |
| HEC | | | |
| FCP_RSP_INFO (M BYTES <= 86) | | | | ← 1080
| FCP_SNS_INFO (N BYTES <= 84) | | | |
| PAD BYTES (1-39 BYTES) | | | |
| CPCS-UU (1 BYTE) | | | | ← 1030
| CPI (1 BYTE) | | | | ← 1032
| LENGTH (2 BYTES) | | | |
| CRC (4 BYTES) | | | | ← 1036

ATM/SONET NETWORK ENHANCED AS A UNIVERSAL COMPUTER SYSTEM INTERCONNECT

BACKGROUND OF THE INVENTION

1. Field of the Invention

This invention relates in general to computer system interconnect technologies, and more particularly, to an enhanced ATM (Asynchronous Transfer Mode) switch for use as a universal computer system interconnect.

2. Description of Related Art

SONET (Synchronous Optical Network) and ATM differ from data services like frame relay and SMDS (Switched Multimegabit Data Service) in that they serve as both address carrier infrastructure and customer services. SONET can serve as the underlying transport for ATM, which in turn can be used to support a variety of other services, such as frame relay and voice.

SONET is a transmission technology, while ATM is a switching technology. Transmission covers the way data is encoded and transported across the network and covers such aspects as the network's data rates, multiplexing schemes, encoding techniques, and transmission media. Switching involves the means used to route the data across the network.

SONET does not apply directly to switches. Rather, it specifies the interfaces between switches that are linked by optical fiber. While SONET does not apply to switches, an ATM switch or its central-office counterpart or even a LAN switch can be fitted with a SONET interface.

Currently, SONET is being deployed on public networks around the world. Thus, pairing SONET transmission technology and ATM switching technology will provide extremely fast, superstable switched public networks with the capability to handle all forms of information, i.e., data, voice, and video.

One of the key features of ATM is that it spans the local and wide area. The technology begins with voice, data, and video, and then slices and dices them into 53-byte cells. The 53-byte cells are then transmitted over highspeed circuits. Intelligent end equipment takes care of segmentation and reassembly (SAR).

ATM networks are provisioned much the same as frame relay networks. Subscribers select access and port speeds and a sustained information rate (SIR), which is comparable to frame relay's committed information rate (CIR). For example, subscriber traffic can enter a carrier's ATM network at 45 Mbit/s with a SIR of 10 Mbit/s. The traffic is guaranteed to travel through the network at 10 Mbit/s but can burst to higher bit rates when network capacity is available.

Because ATM is ideal for switch cost and the fact that it is designed to carry voice, data and video, ATM is quickly becoming the favored Local Area Network (LAN) technology. As a result, many companies are now shipping ATM switches that are ATM based and provide translations to other LAN technologies such as Ethernet, Token ring, and T1. Further, ATM networks are already replacing most other WANs, MANs and LANs. It is also a minor addition to include the regular office telephone communications function in an ATM based link to the office.

Nevertheless, present day computer systems have a multitude of interconnect technologies. These include communications interconnects such as Ethernet, Token ring, and Bi-sync. In addition, there are peripheral interconnects such as SCSI, SSA or Fibre Channel. Further, there may be special high performance system interconnects that provide low latency CPU node to CPU node messages or cache coherency traffic. One example of such an interconnect is the Scaleable Coherent Interface that supports cache coherency traffic so that multiple nodes of a symmetric multiprocessing system work as if connected on the same memory bus. This multitude of interconnect technologies is expensive, difficult to manage, difficult to maintain and often fails.

At the present time, CPU node interconnect and peripheral interconnects are not currently provided for by ATM technology. For example, massively parallel, shared-nothing architectures require message passing between nodes to coordinate parallel computing operations. FIG. 11 illustrates a massively parallel processing system 1100. Processing systems 1102, 1104, 1106, 1108 are interconnected by a node interconnect cloud 1110. The node interconnect cloud 1110 may comprise a star, ring or bus topology. Accordingly, node to node messaging between the processing systems 1102, 1104, 1106, 1108 are possible. The processing systems are also connected to a LAN cloud 1112 for communicating with clients. Further, each processing system 1102, 1104, 1106, 1108 may access a plurality of disk arrays 1122, 1124, 1126, 1128 via a peripheral bus 1130 such as a SCSI bus. However, message latencies from application to application must be orders of magnitude faster than currently provided by existing LAN latencies.

Shared file system architectures require either a complete or partial implementation of a distributed file system manager providing various bookkeeping, file locking, and synchronization functions. FIG. 12 illustrates a shared file system architecture 1200. Processing systems 1202, 1204, 1206, 1208 are interconnected by a distributed file system manager interconnect cloud 1210. The distributed file system manager interconnect cloud 1210 may comprise a star, ring or bus topology. Again, node to node messaging between the processing systems 1202, 1204, 1206, 1208 are possible. The processing systems are also connected to a LAN cloud 1212 for communicating with clients. Further, each processing system 1202, 1204, 1206, 1208 may access a plurality of disk arrays 1222, 1224, 1226, 1228 via, for example, a SCSI bus 1230. The latencies required are even faster than massively parallel processing systems to support performance goals of shared file systems. Latencies for shared file systems should be in the 10 us and lower range.

FIG. 13 illustrates a symmetric multiprocessor processing system 1300. In the symmetric multiprocessor processing system 1300, a plurality of central processing units 1302, 1304, 1306, 1308 are connected to an I/O sub system 1320 and memory sub system 1330 via memory bus 1340. Thus, the symmetric multiprocessor processing system 1300 facilitates I/O operation between a CPU and the I/O sub system 1320. Each CPU may perform cache coherency messaging between a respective central processing unit. Finally each central processing unit may perform a memory operation between itself and the memory sub system 1330. Symmetric multiprocessor architecture requires cache coherency with latencies below 2 us.

Since cache coherency traffic may be high, through-put is still another issue. Accordingly, computer nodes must have special ATM interface adapters designed to minimize host CPU access to an ATM link and also to connect directly to the ATM switch core.

In addition to node interconnects, peripheral interconnect solutions are needed to interface with an ATM switch. Fibre Channel is presently becoming the new peripheral interconnect of choice, replacing parallel bus SCSI based interconnect.

Fibre Channel is a high speed (1 Gbit/Sec) serial bus interface. Fibre Channel is described in a number of documents, with the core document being entitled, The "Fibre Channel Physical and Signaling Layer" (FC-PH). Fibre Channel technology includes the description of the Fibre Channel packet format, and a suite of Fibre Channel protocols, which can be used to transport some form of payload in either a reliable or unreliable fashion. By defining the contents of the payload and any associated upper level protocols, Fibre Channel can be used to communicate amongst a variety of computing devices. One of the reasons that Fibre Channel is so popular is that one of the payloads and upper level protocols which can be mapped, is the protocol for SCSI. This allows many vendors to use most of the software that is written for peripherals while simultaneously providing them with the benefits of Fibre Channel, the most important of which are Fibre Channel's ability to provide them with a serial bus which has a much higher performance than parallel SCSI buses, and requires much smaller cabling.

The serial SCSI protocol that is supported by Fibre Channel is known through the name, "Fibre Channel Protocol for SCSI", or the aliases, "SCSI Fibre Channel Protocol", or "FCP". The document entitled, the "Fibre Channel Protocol for SCSI", describes the SCSI packet formats, for SCSI Command, Data, and Status packets, as well as the SCSI protocol, pertinent to performing SCSI operations over Fibre Channel. In a purely Fibre Channel environment, SCSI packets are transported as payloads encapsulated within Fibre Channel packets, and the SCSI protocol is usually implemented either in software, or through hardware assists. During the discussion of this patent, SCSI Fibre Channel protocol will be referred to as, "the FCP SCSI Protocol" so as to assist the readers in disassociating the upper level protocol for transacting SCSI operations over Fiber Channel, from the Fibre Channel Protocol proper.

While there are many different types of computer interconnects, no universal interconnect solution presently exists. Nevertheless, ATM naturally meets the requirements of LANs, MANs and WANs, and in the case of computer node interconnect for massively parallel, cluster and symmetric multi-processing, the ATM interface can be designed to provide very low latency transfers between nodes. Peripheral interconnect can also be accomplished by ATM based links. By using ATM's natural ability as a LAN, MAN and WAN together with the cited enhanced capabilities of ATM, an ATM network can be used as a universal interconnect and replace all other computer system interconnects. Thus, an ATM universal interconnect would significantly reduces interconnect cost, interconnect management, and interconnect maintenance as well as improve availability.

Accordingly, it can also be seen that there is a need for a universal computer system interconnect that includes enhanced ATM/SONET capabilities.

SUMMARY OF THE INVENTION

To overcome the limitations in the prior art described above, and to overcome other limitations that will become apparent upon reading and understanding the present specification, the present invention discloses an ATM/SONET network enhanced as a universal computer system interconnect.

The present invention solves the above-described problems by enhancing an ATM switch with CPU node interconnect functionality and peripheral interconnect functionality.

A system in accordance with the principles of the present invention includes node interconnect means for providing low latency transfer between computer nodes and peripheral interconnect means for performing input/output operations with peripherals through the ATM network. The peripheral interconnect means provides support for FCP SCSI protocol commands according to ATM standards. Virtual path identifier/virtual channel identifier (VPI/VCI) addresses of the source and destination are assigned for input/output operations. The FCP supports small computer system interface (SCSI) protocol. A segmentation and reassembly (SAR) unit is provided for performing ATM segmentation and reassembly. The SAR includes functional units which allow direct connection of an application agent to the core of the switch once the cell characteristics are determined by the application agent and provides ATM cell translation to and from available kernel buffers. The application agent looks up the cell characteristics in parallel with the cache look up for data. If the data access misses the cache, the application agent will issue the appropriate cache coherency and memory access messages across the ATM network. The application agent looks up the cell characteristics and determines whether a shared lock request must be broadcast. The peripheral interconnect means uses a FCP SCSI protocol. ATM is implemented by applying the FCP at the ATM service specific level such that input/output operations may be performed with peripherals through the ATM network.

One aspect of the present invention is that the segmentation and reassembly unit translates VPI/VCI in a received cell header to an available kernel buffer memory address, removes the ATM cell header and reassembles the PDU in kernel memory.

Another aspect of the present invention is that the segmentation and reassembly unit includes a direct application input/output unit for transferring directly between a software application and the ATM network.

Another aspect of the present invention is that the direct application input/output unit provides hardware assist for low level operations.

Yet another aspect of the present invention is that the peripheral interconnect means provides for operation at the service specific convergence sublayer of the ATM protocol to provide FCP transfers between peers.

Another aspect of the present invention is that the peripheral interconnect means reads a command block directly from host memory, designates a source and a target Service Specific File Control Protocol unit (SSFCP), builds a VPI/VCI address which is recognized when the target SSFCP sends any messages to the source SSFCP, the source SSFCP building an ATM cell that includes the SCSI command sequence and stores the ATM cell in memory that is dedicated for immediate transmission.

Still another aspect of the present invention is that the transmission media includes digital optical links and the switch further including a synchronous optical network (SONET) interface for providing SONET transmission over the digital optical links in the ATM network.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 2 is a flow chart illustrating the requirements for connecting with the core of the ATM switch according to the present invention;

FIG. 3 illustrates the ATM adaptation layer (AAL);

FIGS. 10a and 10b illustrate the payload for the SCSI response sequence format;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1. Overview

The present invention provides an enhanced ATM universal computer system interconnect that includes CPU node interconnects with low latency between nodes and peripheral interconnects via a high speed bus interface.

Scaleable SMP architectures require very low latency, high performance, high connectivity interconnect to keep up with CPU performance improvements. An enhanced ATM switch can provide the low latency interconnect characteristics that these architectures need.

Figure 1:
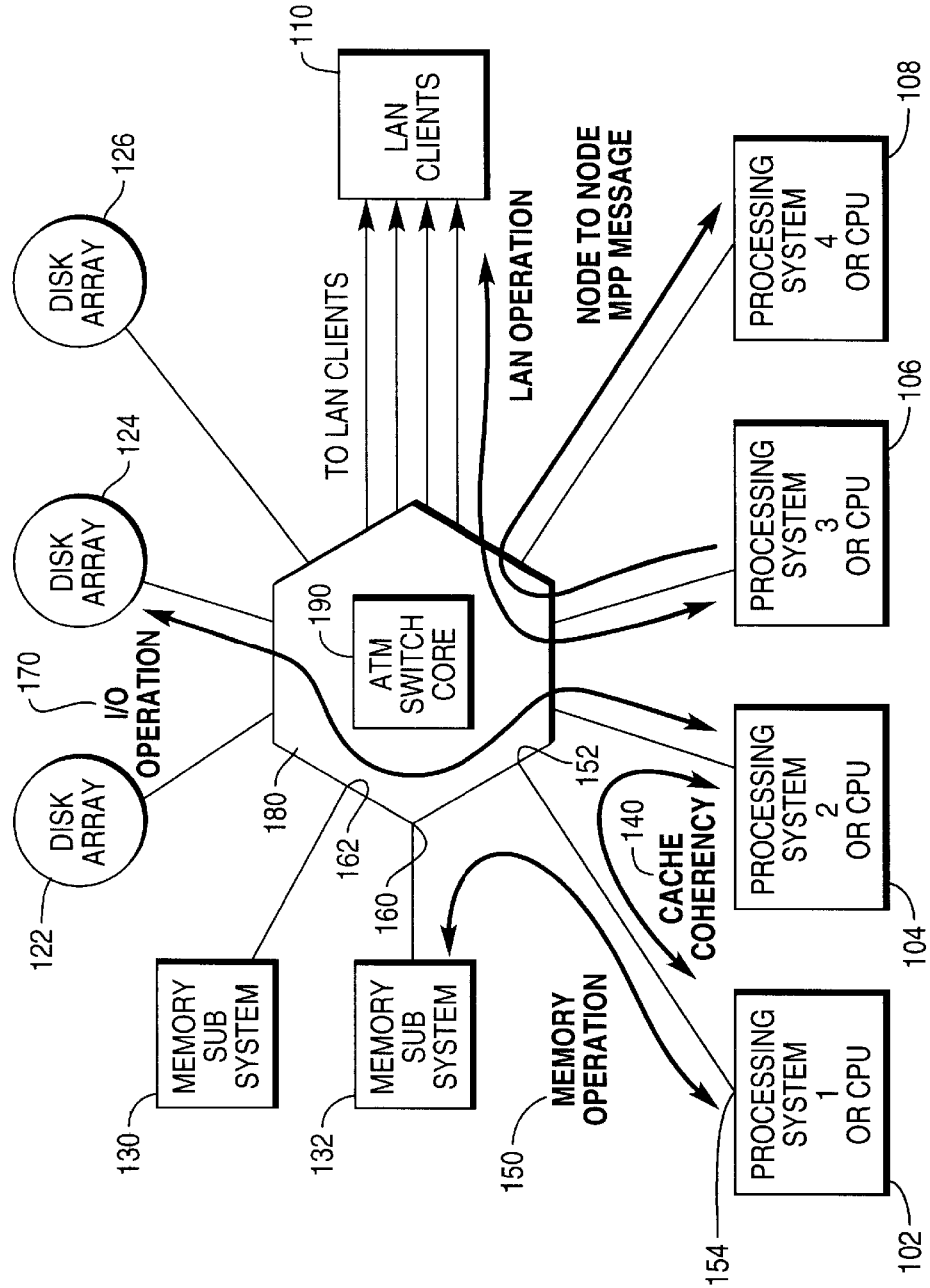
FIG. 1 illustrates a universal ATM interconnect system according to the present invention.

FIG. 1 illustrates a universal ATM interconnect system 100 according to the present invention. In FIG. 1, an enhanced ATM switch 180 according to the present invention is connected to a plurality of processing systems or CPUs 102, 104, 106, 108. LAN operations between the clients 110 and the processing systems or CPUs 102, 104, 106, 108 are routed by the switch 180. Node to node messages between processing systems or CPUs 102–108 are handled by the switch 180. Input/output operations between the processing systems or CPUs 102–108 and a plurality of disk arrays 122, 124, 126 are handled also by the ATM switch 180. Cache coherency between the CPUs are routed through this switch 180. Finally, memory operations between the processing systems/CPUs 102–108 and the memory sub systems 130, 132 are also handled by the enhanced ATM switch 180.

The computer nodes 102–108 must have special ATM interface adapters designed to minimize host CPU access to the ATM link and also to connect directly to the switch core 190 forming the core of the ATM switch 180. Also, the architecture for the ATM switch 180 must be designed for very low latency as described above. The lowest latency use of an ATM switch 180 will be achieved by connecting the agents in processing nodes 102–108 that require data transfers directly to the core 190 of the ATM switch 180. These agents could be any combination of CPU, caches, memory controller or I/O controller. To implement SMP, Cluster and MPP architectures, multiple agents of multiple processing nodes will connect to other ports of the ATM switch 180.

The core 190 of the ATM switch 180 is defined as the point where all ATM cell routing parameters have been resolved and the switch is programmed so that ATM cells issued to the core 190 of the ATM switch 180 will be routed to the proper output. Interfacing to the core 190 of the ATM switch 180 requires special preparation on the part of the agents doing so.

These agents may also perform normal ATM network communications to ports of the ATM switch 180 which are communications ports. An additional type of port connection could be to peripherals 122–126 that are ATM compatible.

Using the ATM switch as a system interconnect allows other novel processing node optimizations to improve system performance.

2. Switch Core Connection Requirements

FIG. 2 is a flow chart 200 illustrating the requirements for connecting with the core of the ATM switch according to the present invention. Agents directly connected to the ATM switch core will, in parallel with other agent activities, look up the ATM cell transmit characteristics 202 in a local table: the ATM cell permanent virtual circuit, ATM switch routing tag, cell priority and Quality of Service (QoS). For example, a cache handling a processor read will be checking for a cache hit and at the same time look up the cell transmit characteristics. The fastest method for looking up the cell transmit characteristics will be to relate a memory address to a memory mapped index table that holds the cell transmit characteristics. Accordingly, a read request to a cache would cause the cache controller to use the address of the read request to look up in a table the cell permanent virtual circuit assigned to that memory address range, ATM switch routing tag, AAL type, cell priority, QoS and any other required variables. If there was a cache miss, then a memory read operation would be issued across the ATM network to a memory subsystem 130, 132.

Once these cell transmit characteristics are determined 202, then the agent would perform the ATM Segmentation And Reassembly (SAR) functions 204 and the ATM switch interface functions 206 to allow direct connect. The ATM Segmentation and Reassembly operations 204 include building an ATM cell with proper header 208, and issuing cells 210 with the permanent virtual circuit VPI/VCI at the proper rates according to the circuit/cell AAL type, cell priority and QoS. The ATM switch interface function 206 includes adding the ATM switch routing tags if necessary.

In order for ATM to support many kinds of services with different traffic characteristics and system requirements, it is necessary to adapt the different classes of applications to the ATM layer. This function is performed by the AAL, which is service-dependent. FIG. 3 illustrates the ATM adaptation layer (AAL) 300. AALs 300 are composed of a convergence sublayer (CS) 302 and a segmentation and reassembly (SAR) sublayer 304. The CS 302 is further composed of a common part convergence sublayer (CPCS) 306 and a service specific convergence sublayer (SSCS) 308.

Segmentation and reassembly units 304 segment higher layer packet data units (PDUs) into 48 byte chunks that are fed into the ATM layer 310 to generate 53 byte cells. The common part convergence sublayer 306 provides services such as padding and CRC checking. The common part convergence sublayer 306 takes a service specific convergence sublayer PDU, adds padding if needed, and then adds an 8-byte trailer such that the total length of the resultant PDU is a multiple of 48. The trailer consist of a 2 bytes reserved, 2 bytes of packet length, and 4 bytes of CRC. The service specific convergence sublayer 308 is service dependent and may provide services such as assured data transmission based on retransmissions.

Segmentation And Reassembly (SAR) units provide ATM cell translation to and from available kernel buffers. For transmission to an ATM network, the SAR unit reads Packet Data Units (PDU) from kernel buffers, segments the data into ATM cells, builds ATM cell headers with the proper VPI/VCI (virtual path and virtual circuit) and transmits the cells across the ATM network. For receiving PDUs from the ATM network, the SAR unit translates the VPI/VCI in the cell header to an available kernel buffer memory address, removes the ATM cell header and reassembles the PDU in kernel memory.

However, the kernel is very inefficient in building the PDUs and transferring the information to the application memory space which causes major problems in message latency and throughput. Nevertheless, the SAR unit can be modified to include DAI functionality (Direct Application I/O) to create the most efficient method to transfer directly between the software application and the ATM network.

Figure 4:
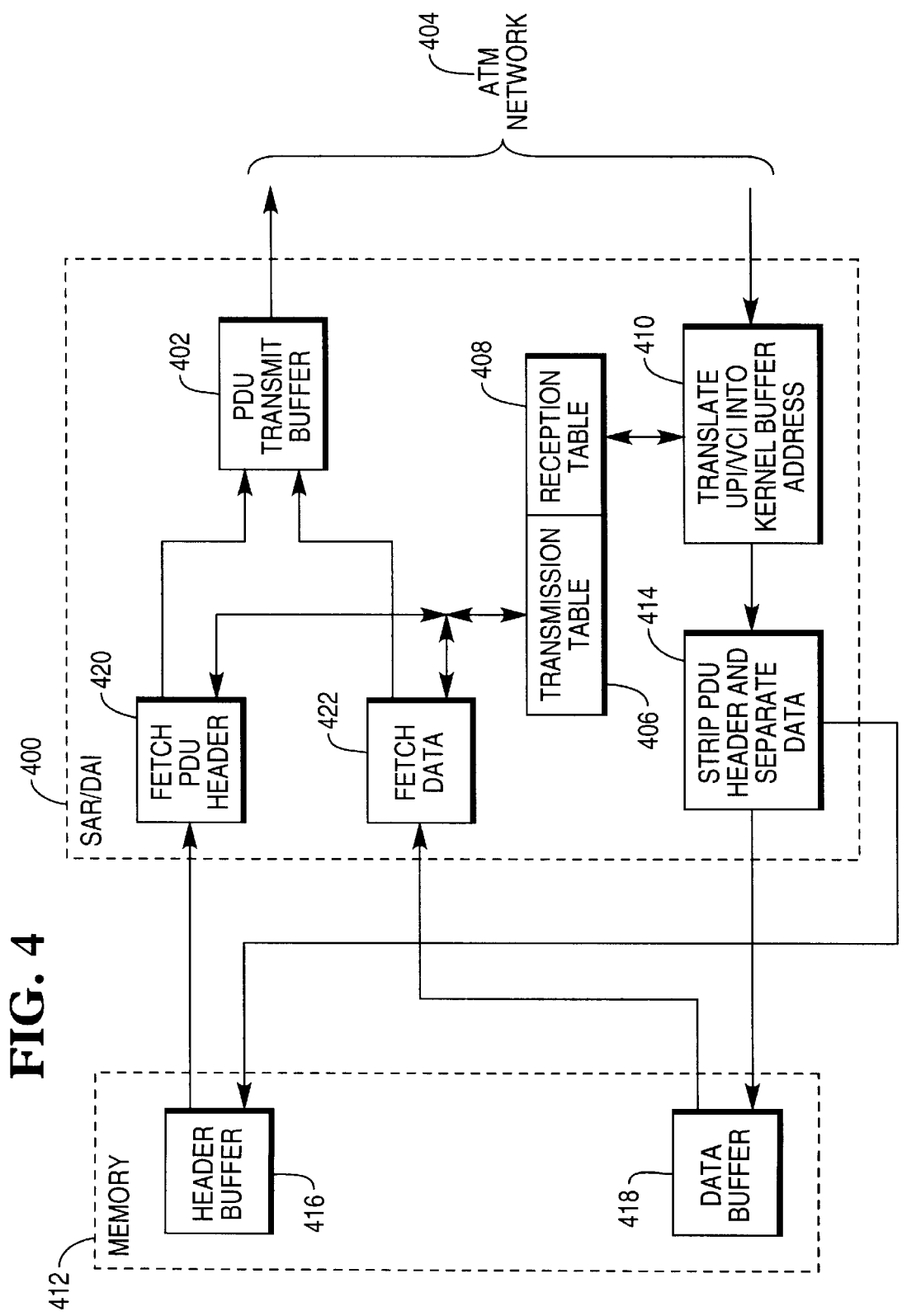
FIG. 4 illustrates a block diagram of a segmentation and reassembly (SAR) unit having enhanced functional units to provide hardware assist for low level operations.

FIG. 4 illustrates a block diagram of a SAR unit 400 having enhanced functional units to provide hardware assist for low level operations. Functional units are added to the basic SAR function to provide hardware assists for many of the low level operations that are normally performed by software or other system components when interfacing to an ATM network. For ATM network transmission, a PDU transmit buffer 402 may be provided in the SAR/DAI unit 400. For transmission of PDUs over the ATM network, the SAR/DAI unit 400 will have some number of buffers 402 of variable length which the application can write directly. When the application finishes writing the PDU, it writes control bits at the very front of the buffer 402. This write marks the buffer as ready for the SAR unit 400 and at the earliest available time slot the SAR unit 400 performs the ATM segmentation and transmits the PDU across the ATM network 404.

However, before an application can use the PDU buffer 402, the kernel has to initialize a table of connection variables (transmission table) 406. These variables include VPI/VCI, AAL type, QoS, buffer enabled, transmission completion notification options, error notification options, kernel lock and other status conditions. The SAR 400 will use these variables 406 in the transmission of the PDU.

For reception of PDUs over the ATM network 404, the SAR/DAI unit 400 will have a table lookup unit (reception table) 408 that the SAR unit 400 uses to translate the VPI/VCI of incoming cells 410 into an application memory address. The SAR unit 400 uses this address to write the cell payload to application space. Other connection variables are also stored in the table such as the AAL type, QoS, buffer enabled, transmission completion notification options, error notification options, application memory address increment options, kernel lock and other status conditions.

All values of the reception table 408 are initialized by the kernel. If the SAR unit 400 does not find a valid entry in the reception table 408 pertaining to the VPI/VCI of the incoming ATM cell, then the SAR unit 400 assumes that the cell is the first of a new connection and the SAR unit 400 acquires a memory address (from its internal registers) of a free kernel buffer or memory 412, stores this address in the reception buffer 410 and proceeds to write the ATM cell to a kernel buffer 412. Subsequent incoming ATM cells with that VPI/VCI will transfer to the same kernel buffer address that is in the reception table 408. The memory address is incremented to account for bytes written to memory 412. After the last cell is received, (last cell is indicated in the ATM header), the SAR unit 400 will coordinate with the kernel 412 to handle the incoming message.

Normally, however, when a PDU is received from the ATM network 404, the SAR unit 400 will interpret the variables in the receive table 408 and if the variables indicate, the SAR unit 400 will strip off 414 the PDU header and write the headers to a header application buffer 416 in memory 412 and write the data to a data application buffer 418 in memory 412, each at a different address. If the PDU has a suffix, this may be handled separately also.

When the SAR unit 400 is engaged to transmit a PDU that is stored in main memory 412, the transmission variable table 406 will give the SAR unit 400 one memory address in the header buffer 416 to fetch the PDU header from 420 and a different memory address in the data buffer 418 to fetch the data from 422.

Thus, multiple functional units may be provided to facilitate hardware acceleration for functions that software has previously performed. The functional units may be integrated within the SAR unit 400 to provide the greatest performance improvement possible from these enhancements.

Referring again to FIG. 1, the enhanced ATM switch 180 according to the present invention utilizes ATM permanent virtual circuits since these circuits are already setup in the ATM switch 180 and there is no circuit setup delay. The cache would issue the read 140 across the ATM switch 180 to a memory agent 130, 132 only if the cache line state look-up indicated that there was a cache miss.

Memory 130, 132 is mapped access across the ATM switch 180. Memory accesses, control register accesses, cache protocol transfers, etc. are accomplished by translating the memory address to the proper ATM cell routing tag and/or the cell VPI/VCI to ensure that the memory operation 150 causes a transfer to arrive at the proper output 152 of the ATM switch 180, target node and agent 154. This requires the memory address ranges be permanently associated with specific VPI/VCI addresses.

Cell transmission is synchronized to an ATM switch 180. A lower latency direct connection to the ATM switch 180 can be accomplished if the agent interfacing to the core of the ATM switch 180 synchronizes its transmission of cells to the time period when the core of the ATM switch 180 expects new cells. The synchronization required is in the range of +/− 10 nS. To achieve this synchronization, the agent can trigger off of the ATM cells it is receiving from the ATM switch core.

As usual the standard AAL type, cell priority and QoS consideration must be handled by the agent. In addition, some ATM core architectures assume additional flow control that was normally done by the line cards of the ATM switch 180. The agent that is directly connected to the core of the ATM switch 180 must provide flow control so that the switch 180 is not over-run by cells such that cells are dropped. Now the agent, such as the cache/ATM-interface, has to perform these flow control functions. For example, the agent will limit the rate of cells to each switch output (e.g. output 152) and make sure the cell to cell timing does not violate this rate limit. Some ATM core architectures may require that the rate be limited to INPUT/(N * OUTPUT) where INPUT is the rate that cells can be issued into the switch 180 from each input, N is the number of switch inputs that can send to an output and OUTPUT is the rate at which the output can dispose of the cells. Other ATM architectures are possible without departing from the invention, and may require individual signals to effect flow control.

The agent must have additional facilities to accommodate these additional rate limitations requirements. A distributed system architecture reduces queue latency. To reduce queuing latency to shared resources, the shared resources can be segmented and distributed to multiple ATM ports. As an example, main memory 130, 132 can be divided and placed on more than one ATM port 160, 162. This will divide the memory access queues and allow more accesses in parallel. Additional benefits will occur by hashing memory hot spots across the memory ports.

Further, agents may perform low latency I/O functions 170. Since all agents have ATM interface capabilities, the I/O operations 170 can be optimized by having each agent perform I/Os specifically directed for that agent. For example, a CPU may perform a communications transmit directly to CPU cache, a cache may perform a disk read directly to cache, and a memory agent may perform a disk read directly to memory buffers.

The I/O only node and the memory only node are examples of single function, shared resources. The single function, shared resources reduces latency by eliminating system interconnect contention problems that occur when a node on a interconnect port has CPU, memory and I/O functions combined and each of those functions coincidentally transfer to functions on other nodes. Also, affinity of I/O processes for specific nodes is a much smaller issue. For example, I/O nodes would transfer directly to ports that required the I/O or to main memory buffers.

The ATM switch 180 is also capable of duplicating a broadcast ATM cell at the last possible branch in the ATM switch. This allows broadcasts to be performed with less interconnect contention thereby improving interconnect throughput. As an example, broadcasting of cache invalidates would take the minimum interconnect bandwidth.

An ATM agent may also function as a small ATM switch with minimal addition of logic. The ATM bus of the ATM agent may have multiple ports or could be connected to a port expansion device. Logic would be added to each port to allow each port on the bus to recognize routing tags or VPI/VCI values of the cells and then capture ATM cells addressed to the port.

A local ATM switch 180 may meet all system interconnect requirements for an entry level system. The local ATM switch 180 can reduce system interconnect traffic by allowing agents to also connect directly to any number of local devices and avoid passing through the large switch. As an example, a memory agent 130, 132 can use a local ATM switch 180 to gain access to direct connect disk arrays 122, 124, 126 that are ATM compatible. The memory 130, 132 can perform a disk read operation directly into memory buffers and not use system interconnect resources. Another important example is for an application to set up a disk read from a disk array 122, 124, 126 and have the disk array 122, 124, 126 assign the VPI/VCI to the cells so that the cells go through the local switch 180 to the ATM network 110 and directly to the client. This switched I/O would completely avoid host memory, I/O bus and I/O adapters. This would result in a tremendous savings of hardware and software resources.

Accordingly, an ATM switch 180 can provide a very low latency computer system interconnect by using novel techniques to 1) connect various system components directly to the ATM switch core, 2) configuring the system for lowest latency, maximum throughput and minimum contention, and 3) use features of the ATM switch to improve computer system interconnect efficiency.

3. Peripheral Interconnect Requirements

In addition to the above-described advantages, universal interconnect to peripherals may also be provided by the enhanced ATM switch. Multiple serial interface standards are available today. Two of the most popular of the emerging standards are ATM and Fibre Channel. ATM is used primarily for communications, while Fibre Channel is used primarily for interfacing to peripherals and supports the SCSI protocol standard. The serial SCSI protocol over Fibre Channel is called the SCSI Fibre Channel Protocol or FCP. Nevertheless, system cost may be reduced by eliminating the need for both of these serial interfaces. Since ATM is the established standard for WAN, MAN and LAN, the best solution is to use ATM for interfacing to peripherals. To accomplish this, the FCP can be applied to ATM. But for FCP to function properly over ATM, both protocols must be enhanced. FCP can be implemented at the ATM Service Specific level. A hardware functional unit may be integrated into a ATM SAR ASIC to operate at the Service Specific Convergence Sublayer of the ATM protocol to provide FCP transfers between peers. This Service Specific FCP unit (SSFCP) perform SCSI peripheral reads and writes.

Figure 5A:
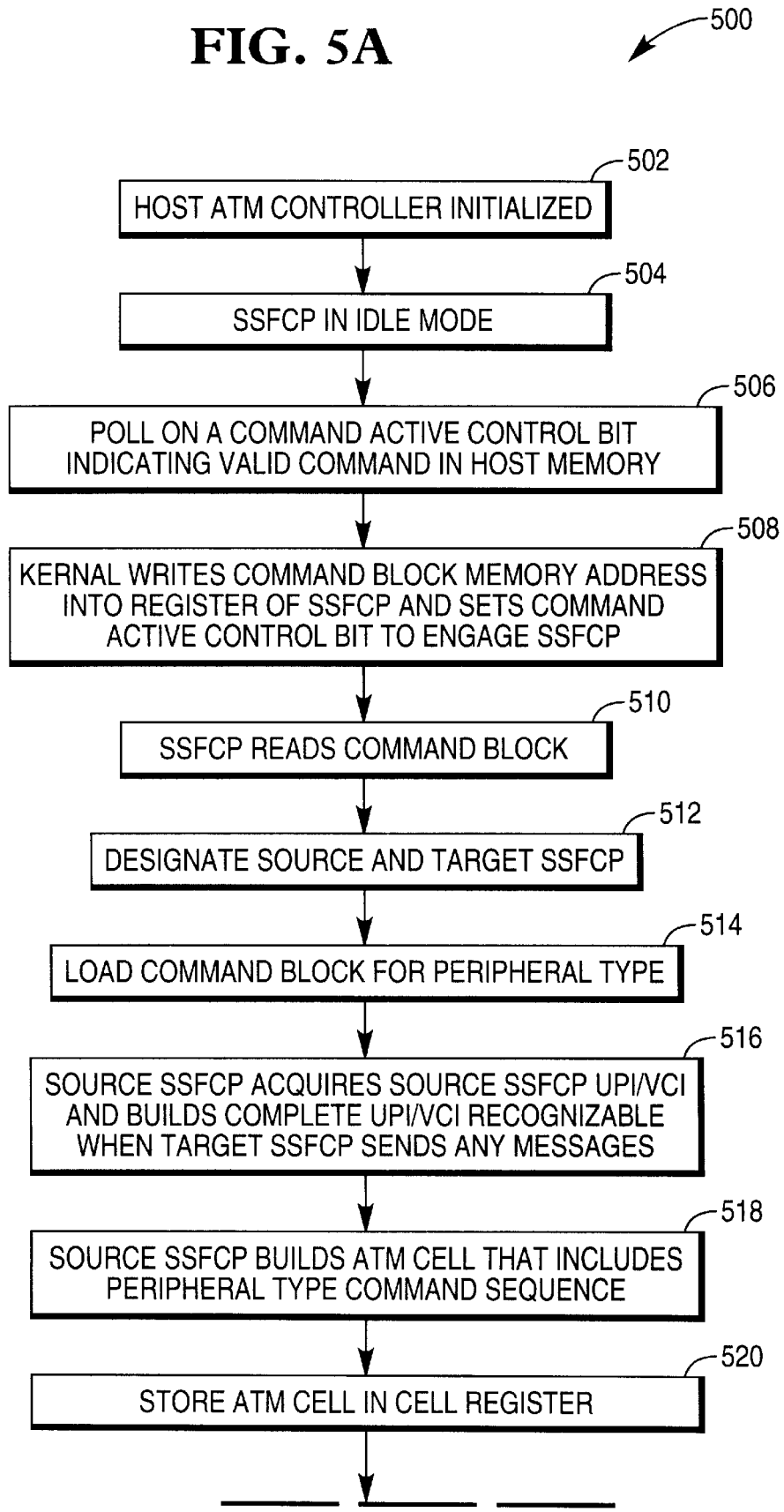
FIG. 5 illustrates a flow chart for FCP transfers according to the present invention.
Figure 5B:
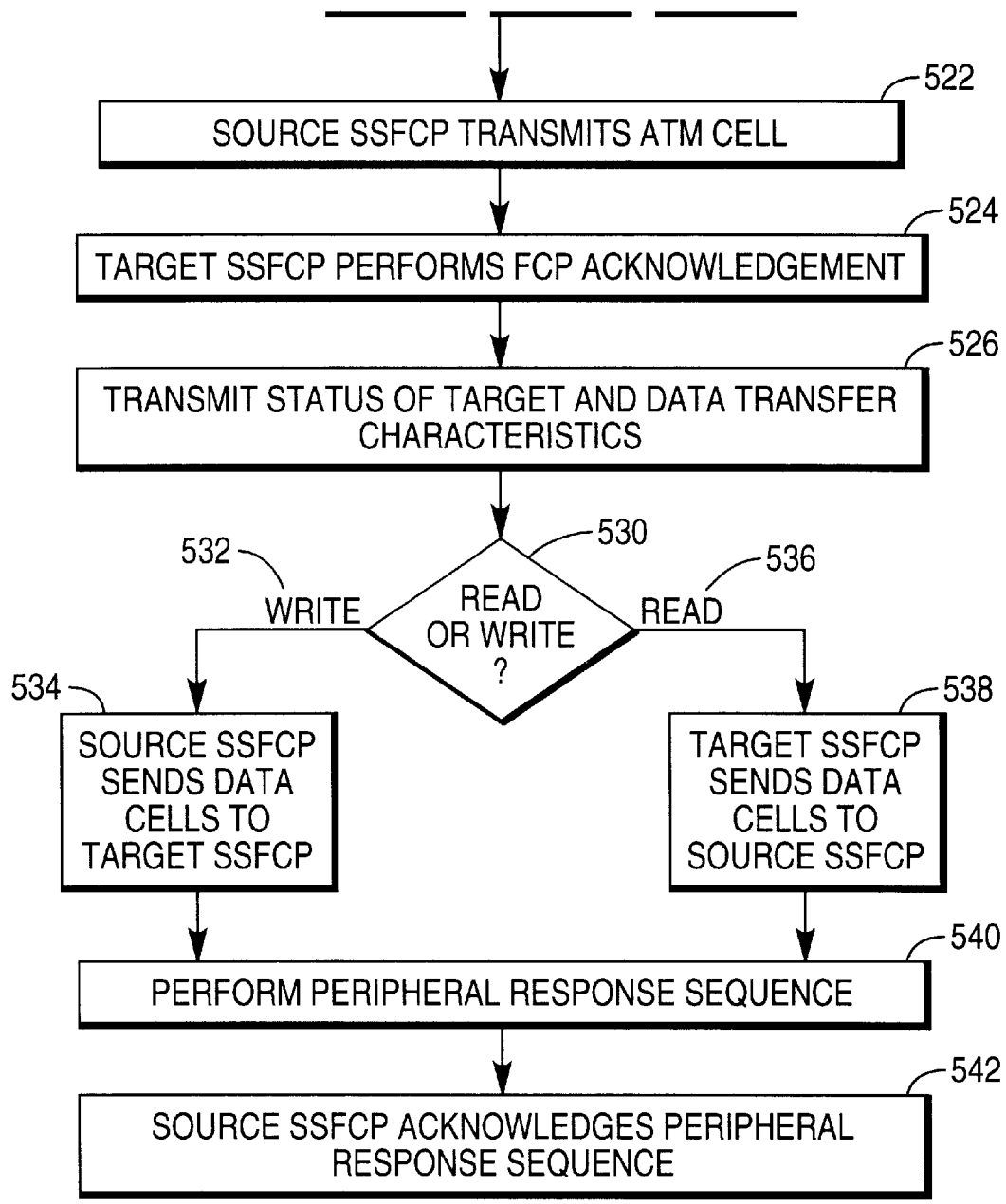

FIG. 5 illustrates a flow chart for FCP transfers 500 according to the present invention. After the host ATM controller is initialized 502, the Service Specific FCP unit (SSFCP) is in idle mode 504. In the idle state, the SSFCP will poll on a command active control bit in the SSFCP that indicates if there is a valid command in host memory 506. The kernel then writes the command block memory address into a register in the SSFCP before setting the command active control bit to engage the SSFCP 508. The SSFCP will directly read from host memory a 64 byte command block 510.

Figure 6:
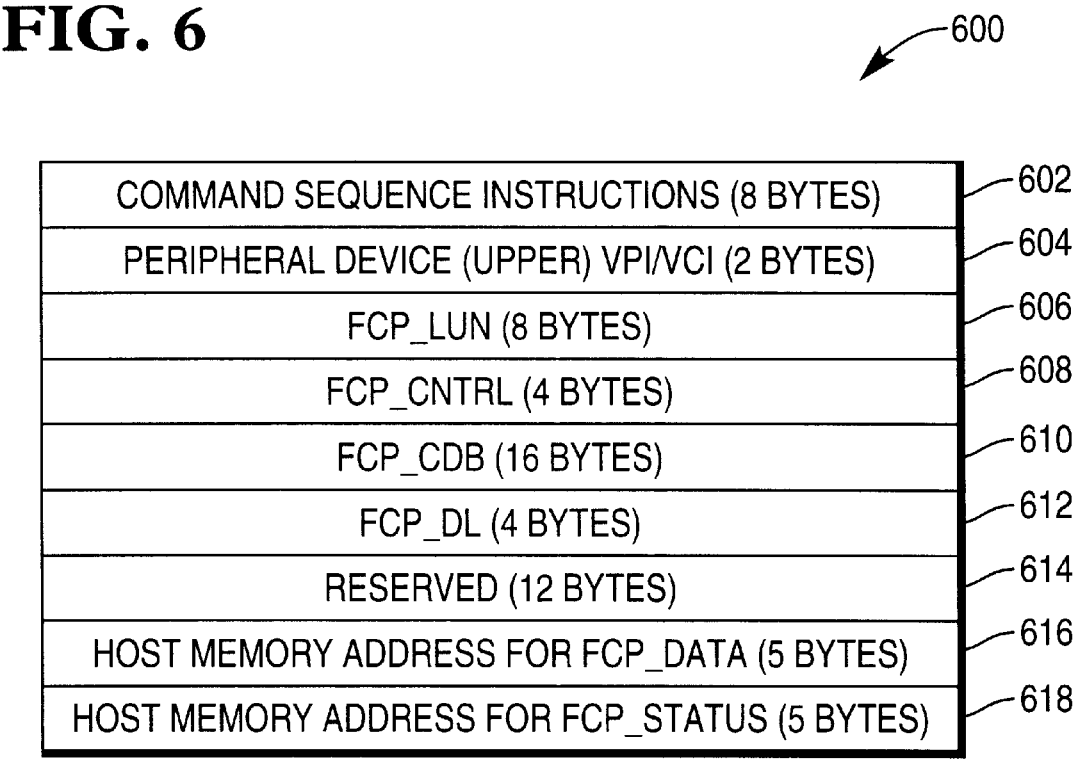
FIG. 6 illustrates the field in the command block.

The command block is composed of fields 600 as illustrated in FIG. 6. The SSFCP will continue to read additional command blocks according to instructions in the Command Sequence Instructions part 602 of the command block. The command block further includes VPI/VCI address 604 for a peripheral device. A logical unit number field (FCP LUN) 606 identifies a particular peripheral. The control field (FCP CNTRL) 608 contains the task codes, task management codes, flags, and read/write commands. The command descriptor block field (FCP CDB) 610 contains details of operations for a device. The data length field (FCP DL) 612 indicates the greatest number of data bytes to be transmitted. A reserved field 614 is provided for additional operations. Finally, the host memory has an address where the data 616 is fetched from if the operation is an I/O write or where in host memory the data is written to if the operation is an I/O read. The last field 618 is the host memory address where the SSFCP will write the status of the operation.

Referring again to FIG. 5, at I/O initiation the SSFCP that initiates an I/O operation is designated as the source SSFCP 512. The source SSFCP in normally in the host. The SSFCP that responds to the I/O request is designated as the target SSFCP 512 and is normally in the peripheral. After the source SSFCP loads, for example, a SCSI I/O command block 514, the source SSFCP acquires a source SSFCP VPI/VCI from a free pool that it maintains and builds a complete VPI/VCI address 516 that it will recognize when the target SSFCP sends any messages to the source SSFCP. The source SSFCP then builds an ATM cell that includes the SCSI command sequence and other information 518 and stores the ATM cell 520 in a cell register that is dedicated for immediate transmission 522. The SAR will have up to a predetermined number (N) of ATM cell registers and time slots reserved for FCP command transfers. The predetermined number N is implementation dependent.

Figure 7:
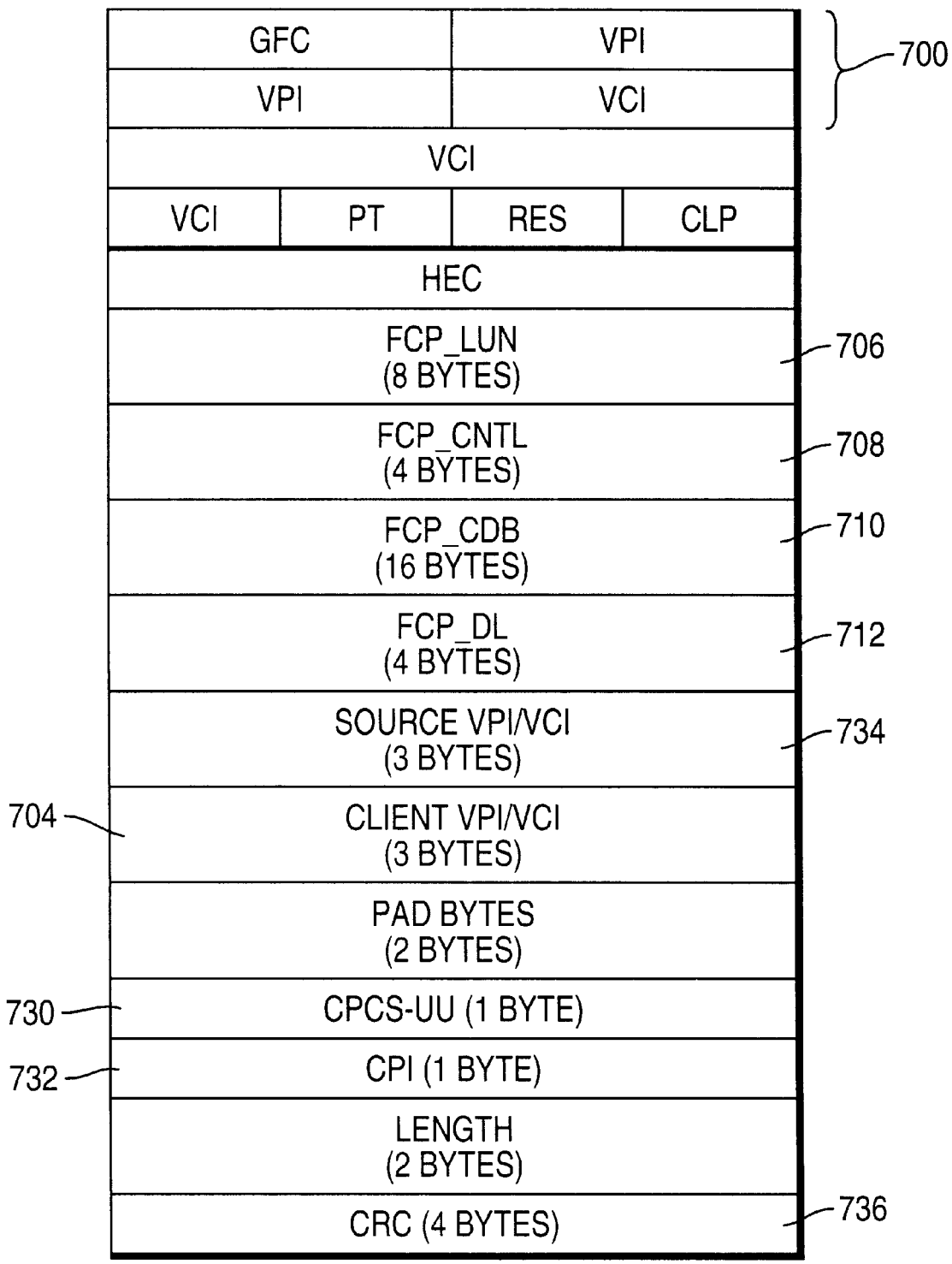
FIG. 7 illustrates the ATM format for the FCP.

The ATM format for the FCP is illustrated in FIG. 7. Note there are additions to the standard FCP. The VPI/VCI of source 702 and 734 is used by the target SSFCP when transmitting ATM cells to route cells back to the source SSFCP and to allow the source SSFCP to identify which I/O operation the ATM cell is concerned with. The client VPI/VCI 704 is optional and is used only if switched I/O is supported. The client VPI/VCI 704 is used by the target SSFCP when transmitting ATM cells to route cells directly to the client and to allow the client SSFCP to identify which I/O operation the ATM cell is concerned with. The AAL-5 Common Part CS 730 will identify this as a FCP compatible operation as opposed to standard ATM or some other service specific function. The FCP fields 706–712 are similar to those discussed with reference to FIG. 6. Common part indicator field 732 is a one byte field for indicating the number of bits of buffer space needed for reassembly. A field is also provided for source 734 VPI/VCI. Finally, a four byte cyclic redundancy check field 736.

Referring again to FIG. 5, when the target SSFCP receives the ATM cell, the target SSFCP performs an FCP acknowledge function 524 by duplicating the ATM cell payload and transmitting it back to the source SSFCP. When SCSI I/O transfer is ready, the target SSFCP will respond to the I/O initiation command block by communicating to the source SSFCP the status of the target and the data transfer characteristic that the target can support 526.

Figure 8:
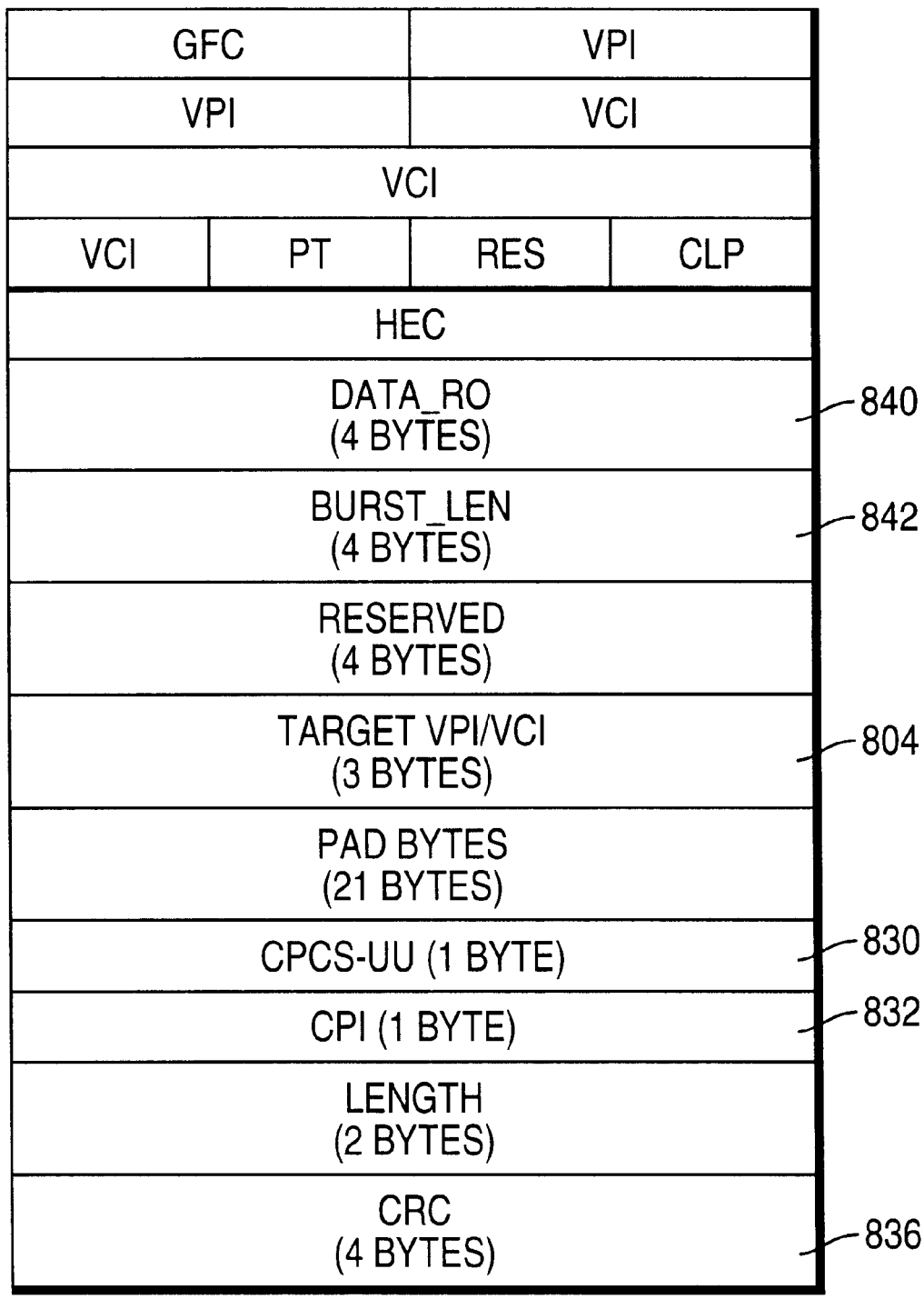
FIG. 8 illustrates the formatting of an ATM cell containing status and transfer characteristic information.

The status and transfer characteristic information is placed in an ATM cell 800 formatted as illustrated in FIG. 8. Note that this is the FCP protocol with additions for ATM. The VPI/VCI of target 804 is the target notifying the source SSFCP to use this VPI/VCI in any future ATM cell headers to route ATM cells to the target and to indicate to the target which I/O the cell pertain to. When the source receives this command, it will duplicate the payload and transmit it back to the target SSFCP to perform the FCP acknowledge operation of this message. In addition, a data relative offset field (DATA RO) 840 is provided for indicating the offset of the first byte on the fiber channel and a burst length field (BURST LEN) 842 is provided for identifying how many bytes the next transfer will contain.

Figure 9A:
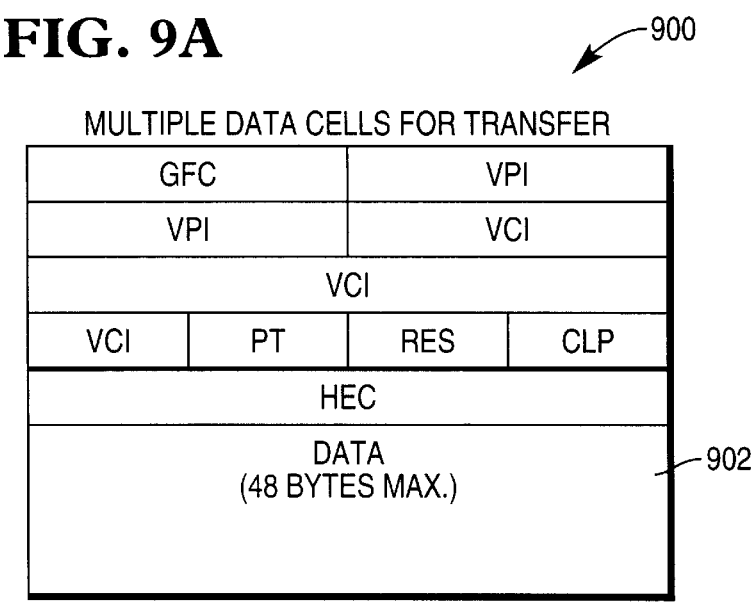
FIGS. 9a and 9b illustrate the ATM cell payload format for the data transfer in a SCSI I/O data transfer.
Figure 9B:
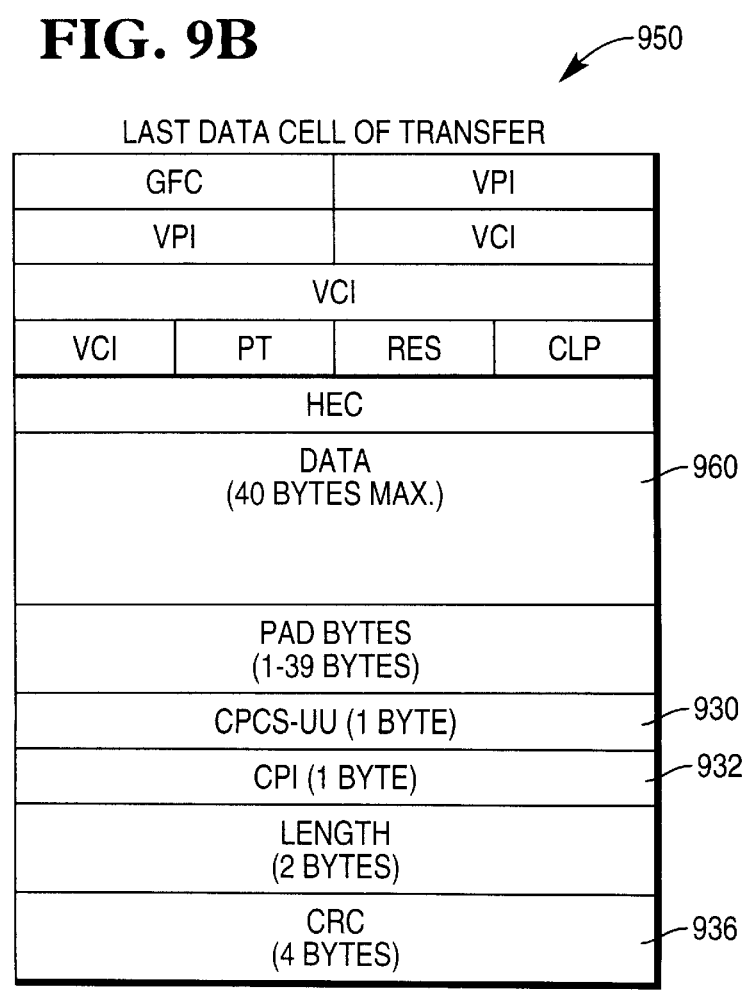
Figure 11:
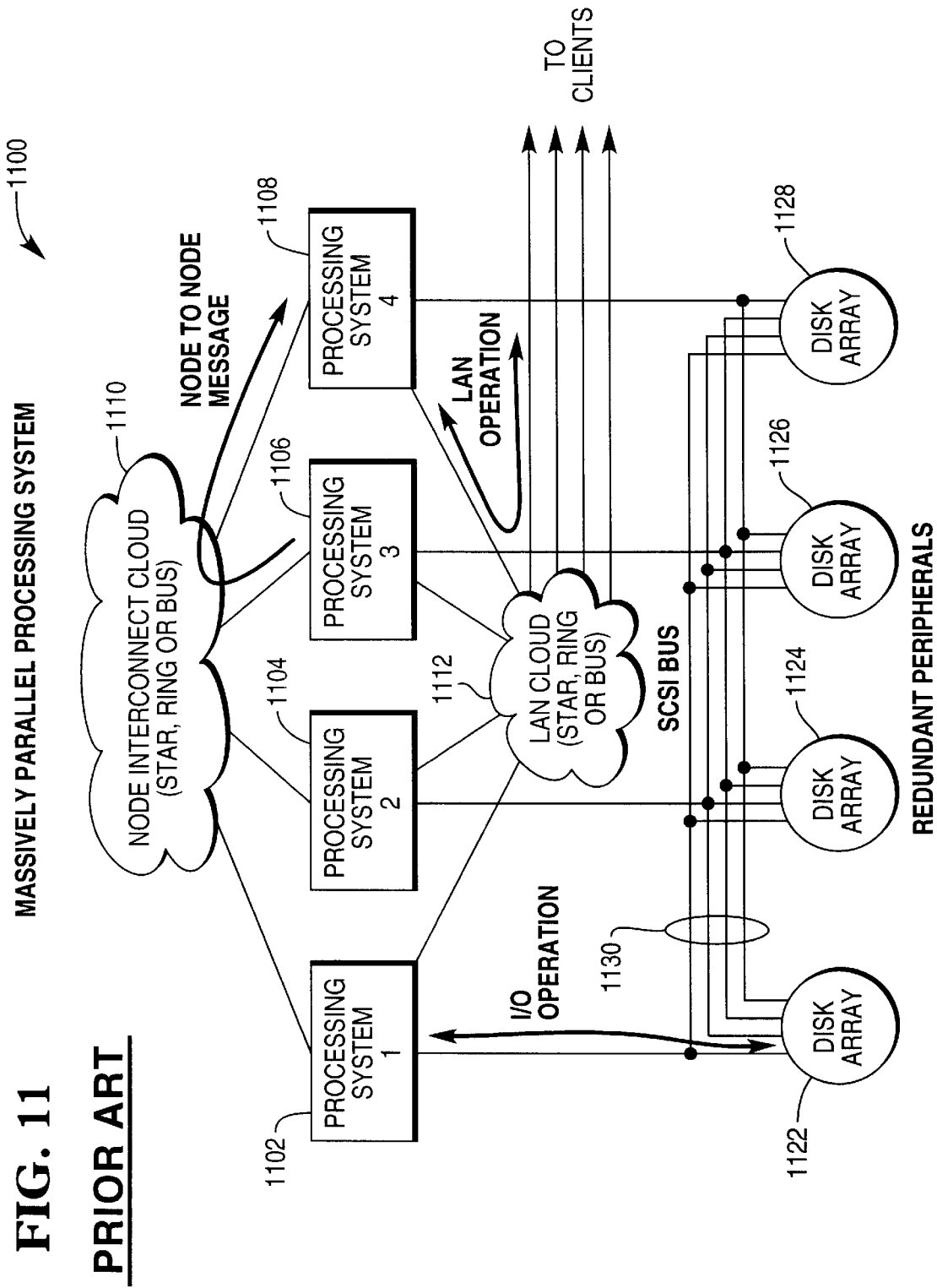
FIG. 11 illustrates a massively parallel processing system according to the prior art.
Figure 12:
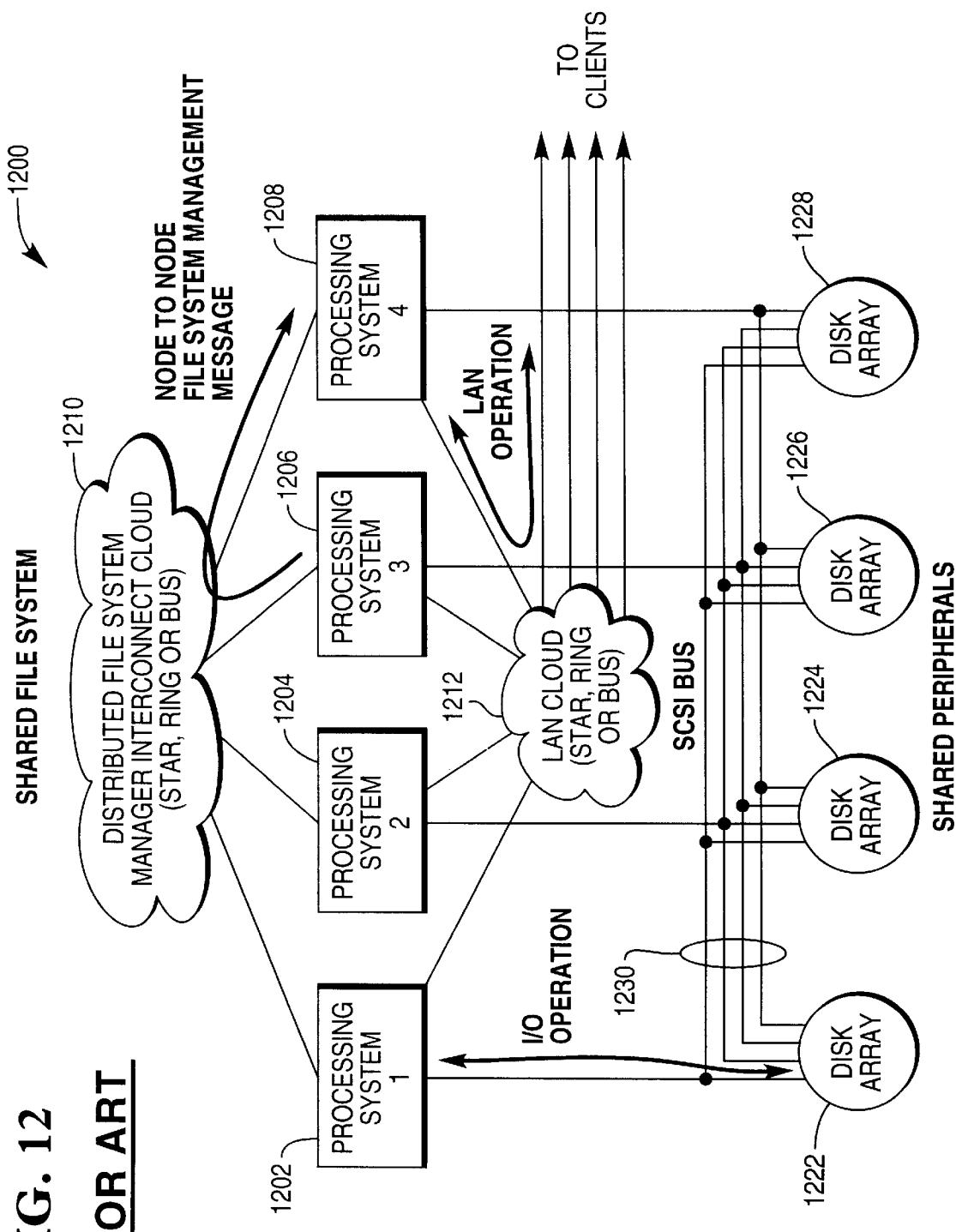
FIG. 12 illustrates a shared file system architecture according to the prior art.
Figure 13:
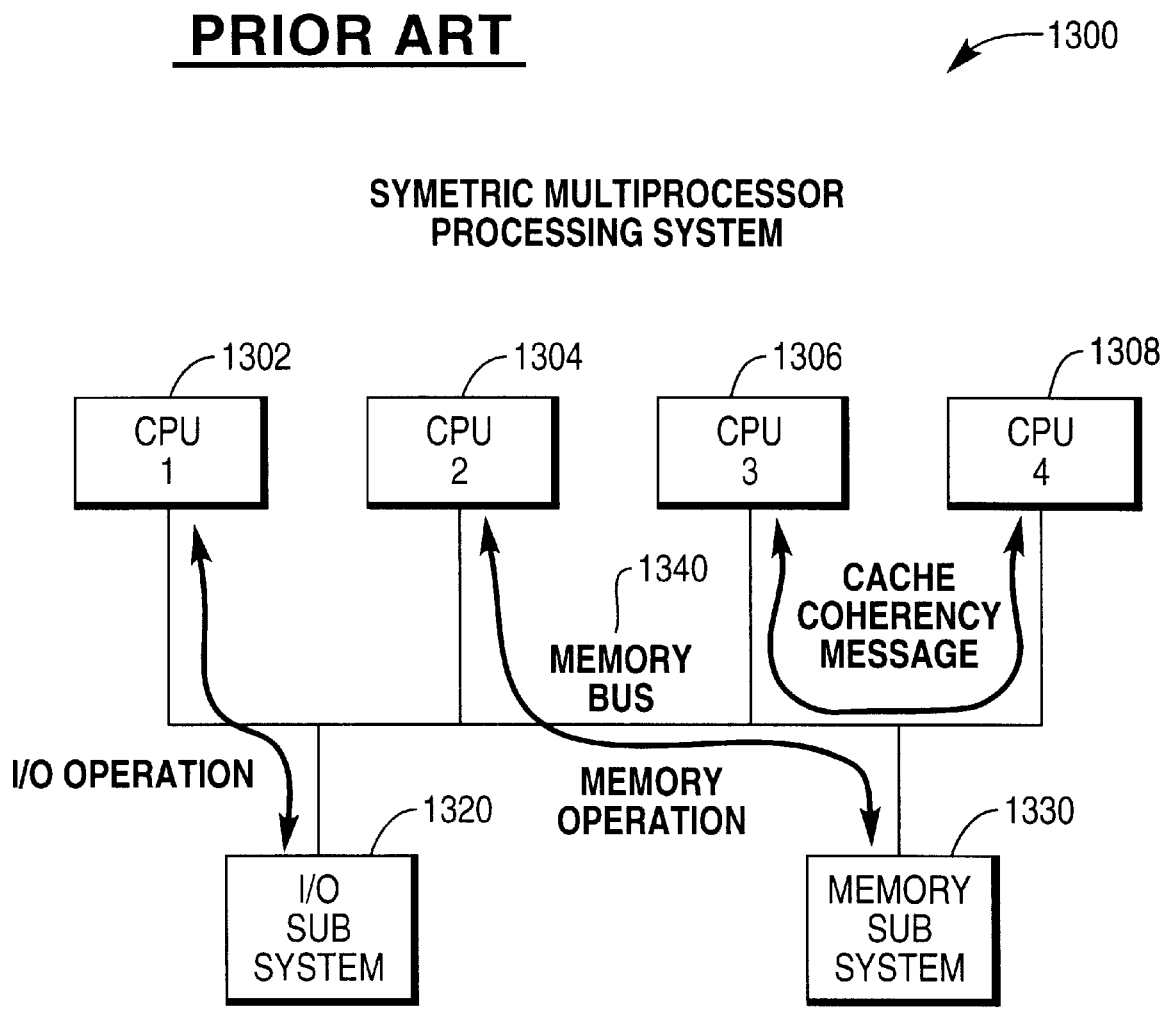
FIG. 13 illustrates a symmetric multiprocessor processing system according to the prior art.

For SCSI I/O data transfer, the ATM cell payload format for the data transfer is illustrated with reference to FIGS. 9a and 9b. FIG. 9a illustrates the ATM cell payload format 900 for multiple data cells 902 for transfer. FIG. 9b illustrates the ATM cell payload format 950 for the last data cell 960 of transfer.

Again turning to FIG. 5, the type of operation is determined 530. If the operation is a disk write 532, then the source SSFCP will be sending the data cells to the target SSFCP 534. If the I/O operation is a disk read 536, then the target SSFCP will be sending the data cells to the source SSFCP 538. Data cells are not acknowledged by any returning cells when they are received. The only acknowledge is the SCSI response sequence described below.

The payload for the SCSI response sequence format is illustrated with reference to FIGS. 10a and 10b. FIG. 10a illustrates the SCSI response sequence format 1000 for multiple transfers. A status field (FCP STATUS) 1070 provides a status indication to the source and a residual count field (FCP RESID) 1072 identifies the number of bytes that were transferred. A SNS length field (FCP SNS LEN) 1074 indicates the length or number of bytes in the SNS information. A response length field (FCP RSP LEN) 1076 identifies the number of valid bytes in the response information field (FCP RSP INFO) 1078 which describes protocol failures. FIG. 10b illustrates the SCSI response sequence format 1050 for the last cell of transfer. A SNS information field (FCP SNS INFO) 1080 provides the actual sense command.

Referring again to FIG. 5, after the data transfer portion of the I/O operation is complete, the target SSFCP sends the SCSI response sequence to the source SSFCP to complete the I/O 540. The source SSFCP will acknowledge the SCSI response sequence by reflecting SCSI response information back to the target SSFCP 542.

Thus, a protocol that provides FCP (SCSI serial protocol) commands to be transferred within the ATM standard is provided. A method of coordinating the assignment of VPI/VCI addresses of the source and destination for each I/O operation is also provided. This protocol definition will allow a host computer to perform I/O operations with peripherals through an ATM network.

In summary, the requirement for different types of computer interconnect have been described, and ATM has been shown to meet the requirements of LANs, MANs and WANs. In the case of computer node interconnect for Massively Parallel, Shared and Symmetric Multi-Processing, the ATM interface can be designed to provide very low latency transfers between nodes. Peripheral interconnect can also be accomplished by ATM based links as described. By using ATM's natural ability as a LAN, MAN and WAN together with the above-described enhanced capabilities, an ATM network can be used as a universal interconnect and replace all other computer system interconnects. Further, the utilization of ATM as the universal interconnect significantly reduces interconnect cost, interconnect management, interconnect maintenance and improves availability.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An enhanced asynchronous transfer mode (ATM) switch for switching ATM cell traffic in an ATM network over transmission media, comprising:

a switch fabric forming a switch core, the switch fabric transferring cells among a plurality of bidirectional ports in an ATM network;

at least one node interconnect, operatively coupled to the switch fabric, for providing low latency transfer between the bidirectional ports, the node interconnect comprising a segmentation and reassembly unit for providing ATM cell translation to and from available kernel buffers the segmentation and reassembly unit comprising a direct application input/output unit for transferring directly between a software application and the ATM network; and at least one peripheral interconnect, operatively coupled to the switch fabric, for performing input/output operations with peripherals through the ATM network.

2. The switch of claim 1, wherein the peripheral interconnect further comprises a protocol for providing fibre channel protocol (FCP) commands according to ATM standards.

3. The switch of claim 2 wherein the peripheral interconnect further coordinates assignment of virtual path identifier/virtual channel identifier (VPI/VCI) addresses of a source and a destination for input/output operations.

4. The switch of claim 3 wherein the protocol supports small computer system interface (SCSI) protocols.

5. The switch of claim 1, wherein the segmentation and reassembly unit further performs ATM segmentation and reassembly to allow direct connection of an application agent to the switch fabric once cell characteristics are determined by the application agent.

6. The switch of claim 5 wherein the application agent looks up the cell characteristics by relating a memory address to a memory mapped index table holding the cell characteristics.

7. The switch of claim 6 wherein the application agent looks up the cell characteristics in parallel with cache look up for data.

8. The switch of claim 7 wherein the application agent issues a cache coherency message and a memory access message across the ATM network.

9. The switch in claim 6 wherein in the application agent looks up the cell characteristics and determines that whether a shared lock request must be broadcast.

10. The switch of claim 5 wherein the segmentation and reassembly unit constructs an ATM cell with a proper header, and issues the ATM cell with a VPI/VCI at a rate associated with a circuit/cell AAL type, cell priority and quality of service (QoS).

11. The switch of claim 1, wherein the segmentation and reassembly unit reads packet data units (PDUs) from kernel buffers, segments data into ATM cells, builds ATM cell headers with proper VPI/VCI and transmits the cells across the ATM network.

12. The switch of claim 1, wherein the segmentation and reassembly unit translates VPI/VCI in a received cell header to an available kernel buffer memory address, removes the ATM cell header and reassembles packet data units (PDUs) in kernel memory.

13. The switch of claim 1, wherein the direct application input/output unit provides hardware assist for low level operations.

14. The switch of claim 13 wherein the direct application input/output unit comprises PDU transmit buffers.

15. The switch of claim 14 wherein the PDU transmit buffers comprise a plurality of buffers of variable length for writing directly to and from an application agent.

16. The switch of claim 15 wherein the application agent writes control bits to the front of the PDU transmit buffers.

17. The switch of claim 16 wherein the writing of control bits to the PDU buffers indicates that the buffer is ready for the segmentation and reassembly unit to perform ATM segmentation and to transmit the PDU across the ATM network.

18. The switch of claim 17 wherein the segmentation and reassembly unit further comprises:
a transmission table, the transmission table comprising variables that are used for transmission of PDUs; and
a reception table, the reception table comprising variables for translating VPI/VCI of incoming cells into an application memory address.

19. The switch of claim 16 wherein the segmentation and reassembly unit segments and distributes shared resource to a plurality of ATM ports to reduce queuing latency.

20. The switch of claim 1 wherein the peripheral interconnect applies a fiber channel protocol to an ATM protocol by implementing the fibre channel protocol at an ATM Service Specific level.

21. The switch of claim 20 wherein the peripheral interconnect further comprises a segmentation and reassembly unit, the segmentation and reassembly unit comprising a hardware unit for operating at a service specific convergence sublayer of the ATM protocol to provide FCP transfers between peers.

22. The switch of claim 21 wherein the hardware unit comprises a service specific FCP unit for performing SCSI peripheral reads and writes.

23. The switch of claim 21 wherein the hardware unit further comprises:
means for reading directly from host memory a command block;
means for designating a source and a target Service Specific File Control Protocol (SSFCP);
means for building a VPI/VCI address, the VPI/VCI address being recognized when the target SSFCP sends any messages to the source SSFCP, the source SSFCP building an ATM cell that includes a SCSI command sequence; and
memory for storing the ATM cell, the memory being dedicated for immediate transmission.

24. The switch of claim 23 wherein the target SSFCP receiving the ATM cell performs an FCP acknowledge function by duplicating SCSI response information and transmitting the SCSI response information back to the source SSFCP.

25. The switch of claim 24 wherein the target SSFCP responds to an I/O initiation command block by communicating to the source SSFCP a status of the target and data transfer characteristics that the target can support when SCSI I/O transfer is ready.

26. The switch of claim 25 wherein the target SSFCP sends a SCSI response sequence to the source SSFCP after data is transferred to the target SSFCP, the source SSFCP acknowledging the SCSI response sequence by reflecting SCSI response information back to the target SSFCP.

27. The switch of claim 1 wherein the transmission media comprises digital optical links, the switch further comprising a synchronous optical network (SONET) interface for providing SONET transmission over the digital optical links in the ATM network.

28. A method for providing enhanced asynchronous transfer mode (ATM) switching of ATM cell traffic in an ATM network from the switch fabric over transmission media, comprising:
providing low latency transfer between bidirectional ports and a switch fabric forming a switch core by performing ATM segmentation and reassembly to provide ATM cell translation to and from available kernel buffers, wherein the segmentation and reassembly comprises transferring directly between a software application and the ATM network; and
performing input/output operations with peripherals attached to at least one of the bidirectional ports.

29. The method of claim 28, wherein the step of providing low latency transfer between computer nodes further comprises the step of providing SCSI Fibre Channel protocol (FCP) commands according to ATM standards.

30. The method of claim 29 wherein the step of providing fibre channel protocol commands further comprises the step of coordinating assignment of virtual path identifier/virtual channel identifier (VPI/VCI) addresses of a source and a destination for input/output operations.

31. The method of claim 30 wherein the destination is a client that a Service Specific File Control Protocol unit (SSFCP) is requesting.

32. The method of claim 29 wherein the SCSI Fibre Channel protocol supports small computer system interface (SCSI) protocols.

33. The method of claim 28 wherein the step of providing low latency transfer between computer nodes by performing ATM segmentation and reassembly further allows direct connection of an application agent to the switch fabric once cell characteristics are determined by the application agent.

34. The method of claim 33 wherein the step of segmenting and reassembling further comprises the steps of constructing an ATM cell with a proper header, and issuing the ATM cell with a VPI/VCI at a rate associated with a circuit/cell AAL type, cell priority and quality of service (QOS).

35. The method of claim 33 wherein the step of segmenting and reassembling further comprises the steps of reading packet data units (PDUs) from kernel buffers, segmenting data into ATM cells, building ATM cell headers with proper VPI/VCI and transmitting the cells across the ATM network.

36. The method of claim 33 wherein the step of segmenting and reassembling further comprises the steps of translating VPI/VCI in a received cell header to an available kernel buffer memory address, removing the ATM cell header and reassembling packet data units (PDUs) in kernel memory.

37. The method of claim 28 wherein the step of transferring directly between a software application and the ATM network further comprises the step of providing hardware assistance for low level operations.

38. The method of claim 28 wherein the step of performing input/output operations with peripherals through the ATM network further comprises the step of applying a SCSI Fibre Channel protocol to ATM by implementing the SCSI Fibre Channel protocol at an ATM Service Specific level.

39. The method of claim 38 wherein the step of applying a SCSI Fibre Channel protocol to ATM further comprises the steps of:

reading directly from host memory a command block;

designating a source and a target SSFCP;

building a VPI/VCI address, the VPI/VCI address being recognized when the target SSFCP sends any messages to the source SSFCP, the source SSFCP building an ATM cell that includes a SCSI command sequence; and storing the ATM cell in memory, the memory being dedicated for immediate transmission.

40. The method of claim 39 wherein the step of receiving the ATM cell further comprises the step of performing an FCP acknowledge function by duplicating the ATM cell payload and transmitting it back to the source SSFCP.

41. The method of claim 40 wherein the step of receiving the ATM cell further comprises the step of responding to the I/O initiation command block by communicating to the source SSFCP a status of the target and data transfer characteristics that the target SSFCP can support when SCSI I/O transfer is ready.

42. The method of claim 41 wherein the step of responding to an I/O initiation command block further comprises the steps of sending a SCSI response sequence to the source SSFCP after data is transferred to the target SSFCP, the source SSFCP acknowledging the SCSI response sequence by reflecting ATM cell payloads back to the target SSFCP.

43. The method of claim 28 further comprising the step of providing SONET transmission over digital optical links in the ATM network.

* * * * *